United States Patent
Bao et al.

(10) Patent No.: US 10,203,871 B2
(45) Date of Patent: *Feb. 12, 2019

(54) METHOD FOR TOUCH INPUT AND DEVICE THEREFORE

(71) Applicant: INTERNATIONAL BUSINESS MACHINES CORPORATION, Armonk, NY (US)

(72) Inventors: Sheng Hua Bao, San Jose, CA (US); Jian Chen, Beijing (CN); Zhong Su, Beijing (CN); Xin Ying Yang, Beijing (CN); Xiang Zhou, Hangzhou (CN)

(73) Assignee: International Business Machines Corporation, Armonk, NY (US)

( * ) Notice: Subject to any disclaimer, the term of this patent is extended or adjusted under 35 U.S.C. 154(b) by 458 days.

This patent is subject to a terminal disclaimer.

(21) Appl. No.: 14/992,060

(22) Filed: Jan. 11, 2016

(65) Prior Publication Data

US 2016/0124638 A1 May 5, 2016

Related U.S. Application Data

(63) Continuation of application No. 13/900,832, filed on May 23, 2013, now Pat. No. 9,395,916.

(30) Foreign Application Priority Data

Jun. 29, 2012 (CN) .......................... 2012 1 0226928

(51) Int. Cl.
*G06F 3/0488* (2013.01)
*G06F 3/041* (2006.01)
*G06F 3/0484* (2013.01)

(52) U.S. Cl.
CPC ........ *G06F 3/04886* (2013.01); *G06F 3/0416* (2013.01); *G06F 3/04847* (2013.01); *G06F 3/04883* (2013.01); *G06F 2203/04805* (2013.01)

(58) Field of Classification Search
CPC ............... G06F 3/04886; G06F 3/0416; G06F 3/04847; G06F 3/04883
(Continued)

(56) References Cited

U.S. PATENT DOCUMENTS 6,211,856 B1 4/2001 Choi et al.
7,336,263 B2 2/2008 Välikangas
(Continued)

FOREIGN PATENT DOCUMENTS

CN 103513878 A 1/2014
EP 2500807 A1 9/2012
(Continued)

OTHER PUBLICATIONS

Disclosed Anonymously, "A large size virtual soft keyboard on a mobile device", An IP.com Prior Art Database Technical Disclosure, IP.com No. IPCOM000210694D, Electronic Publication: Sep. 9, 2011, 4 pages.
(Continued)

*Primary Examiner* — Tadesse Hailu
(74) *Attorney, Agent, or Firm* — Jeffrey Kelly

(57) ABSTRACT

The present invention relates to a technical field of touch input and discloses method and device for controlling a mobile apparatus having a touch screen including: generating a virtual keyboard which is larger than a virtual keyboard displaying area in the touch screen; and moving the virtual keyboard in response to a sliding of a touch point, where at least one direction component of a moving direction of the virtual keyboard is opposite to a direction component of a
(Continued)

sliding direction of the touch point. With the technical solution of present application, the input experience for the user can be improved.

8 Claims, 7 Drawing Sheets

(58) Field of Classification Search
USPC .......................................................... 715/773
See application file for complete search history.

(56) References Cited

U.S. PATENT DOCUMENTS

| | | | | |
|---|---|---|---|---|
| 8,352,884 | B2* | 1/2013 | Zalewski | G06F 1/1626 |
| | | | | 715/811 |
| 8,564,555 | B2* | 10/2013 | Day | G06F 3/0416 |
| | | | | 178/18.01 |
| 9,141,280 | B2* | 9/2015 | Van Eerd | G06F 3/04883 |
| 2006/0007178 | A1 | 1/2006 | Davis | |
| 2008/0284744 | A1 | 11/2008 | Park et al. | |
| 2009/0167706 | A1 | 7/2009 | Tan et al. | |
| 2010/0013852 | A1 | 1/2010 | Liu | |
| 2010/0020033 | A1* | 1/2010 | Nwosu | G06F 3/04883 |
| | | | | 345/173 |
| 2010/0109999 | A1 | 5/2010 | Qui | |
| 2010/0156798 | A1 | 6/2010 | Archer | |
| 2010/0164959 | A1* | 7/2010 | Brown | G06F 3/04886 |
| | | | | 345/473 |
| 2011/0187657 | A1 | 8/2011 | Knowles | |
| 2013/0241837 | A1 | 9/2013 | Oga | |
| 2013/0339895 | A1 | 12/2013 | Hirshberg | |
| 2014/0006995 | A1 | 1/2014 | Bao et al. | |
| 2015/0067572 | A1 | 3/2015 | Bai | |
| 2015/0097797 | A1 | 4/2015 | Sirpal et al. | |

FOREIGN PATENT DOCUMENTS

| | | |
|---|---|---|
| JP | 2007026349 A | 2/2007 |
| WO | 2010077235 A1 | 7/2010 |
| WO | 2012037200 A2 | 3/2012 |

OTHER PUBLICATIONS

Hall, "How to turn off natural scrolling in Mac OS X Lion", Jul. 21, 2011, http://www.pocket-lint.com/news/111126-turn-off-natural-scrolling-os-x-lion, 4 pages.

* cited by examiner

METHOD FOR TOUCH INPUT AND DEVICE THEREFORE

BACKGROUND

The present invention relates to a technical solution of touch input, and more specifically, to method for controlling a mobile apparatus having a touch screen and device therefore.

The mobile apparatus is widely used in ordinary work and life. As the touch screen becomes more popular, touch input has become a very important manner for inputting, especially for replacing the traditional physical keyboard with the virtual keyboard. In view of the restriction to the touch screen size of the mobile apparatus, the size and layout of the virtual keyboard can not simulate the traditional physical keyboard, which may affect the user's experience and input efficiency.

With respect to this, the existing virtual keyboards distribute different keys such as letters, special characters and numbers onto different pages, and when inputting the combination of letters, special characters and numbers, the user needs to switch to the page to which the character to be input belongs and then choose the target key, which requires a frequent switching among different pages.

There is provided a technical solution of enlarging a virtual keyboard in the prior art, for example the U.S. Pat. No. 6,211,856 which introduced a method for enlarging the displaying area of the touch screen by enlarging the displaying area in a size predefined by the user and performing scrolling operation on the parts beyond the screen boundary with a virtual direction key.

However, it requires a complicated process whether to move the virtual keyboard with a virtual direction key and then to input or to employ the way of switching pages, and therefore there is a space for improving in the prior art.

SUMMARY

According to a first aspect of the present invention, there is provided a method for controlling a mobile apparatus having a touch screen, the method including: generating a virtual keyboard which is larger than a virtual keyboard displaying area in the touch screen; and moving the virtual keyboard in response to a sliding of a touch point, where at least one direction component of a moving direction of the virtual keyboard is opposite to a direction component of a sliding direction of the touch point.

According to another embodiment of the present invention, there is provided a device for controlling a mobile apparatus having a touch screen, the device including a virtual keyboard generating module configured to generate a virtual keyboard which is larger than a virtual keyboard displaying area in the touch screen; and a virtual keyboard moving module configured to move the virtual keyboard in response to a sliding of a touch point, where at least one direction component of a moving direction of the virtual keyboard is opposite to a direction component of a sliding direction of the touch point.

With the technical solutions of present application, looking for the target key can be speeded up through a relative motion of the touch point and the virtual keyboard, which causes the moving direction of the touch point approximately tend to the orientation in which the target key locates, thereby complying with the inputting habit and the intuition of the users much more. In a further improved technical solution, the whole area of the virtual keyboard can be moved into the virtual keyboard displaying area by sliding the touch point only once, which is much complied with the habit for using the physical keyboard and improves the users' experience and the inputting efficiency considerably.

BRIEF DESCRIPTION OF THE DRAWINGS

Through the more detailed description of some embodiments of the present disclosure in the accompanying drawings, the above and other objects, features and advantages of the present disclosure will become more apparent, where the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
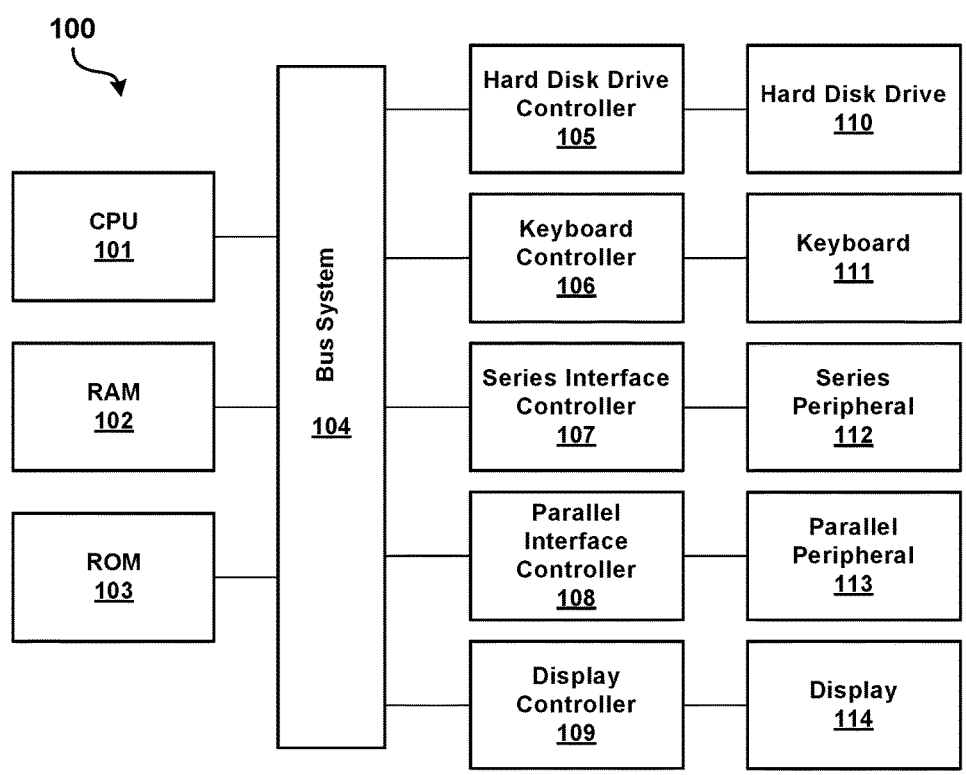
FIG. 1 shows an exemplary computer system which is applicable to implement the embodiments of the present invention.

FIG. 1 shows an exemplary computer system 100 which is applicable to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, in some embodiments, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
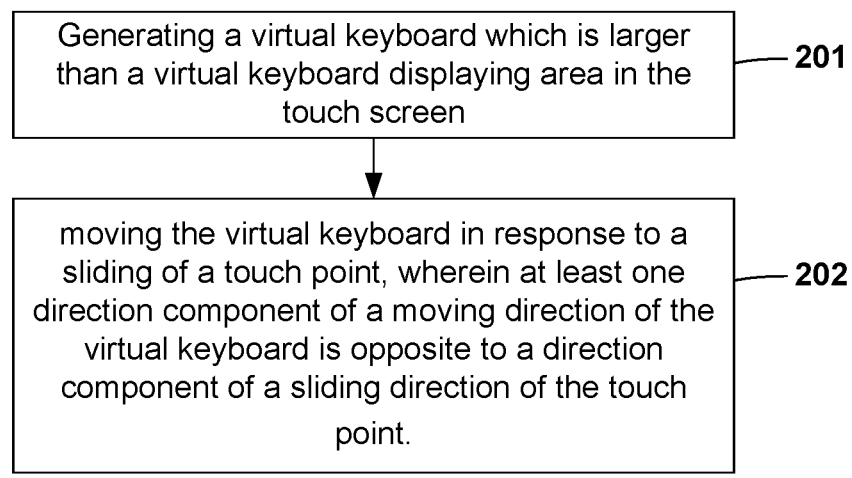
FIG. 2 shows a method for controlling a mobile apparatus having a touch screen.

With reference to FIG. 2 now, there is shown a method for controlling a mobile apparatus having a touch screen.

At step 201, a virtual keyboard is generated, the virtual keyboard being larger than a virtual keyboard displaying area of the touch screen.

Any touch screen in the art including, but not limited to the touch screens of capacitance type, resistance type or the like can be used. The user performs human-machine interactions through a graphical interface displayed on the touch screen which includes at least a virtual keyboard displaying area and an optional text inputting area, a menu controlling area and so on. Moreover, the virtual keyboard may have a shape similar to or different from that of the keyboard displaying area.

Figure 3:
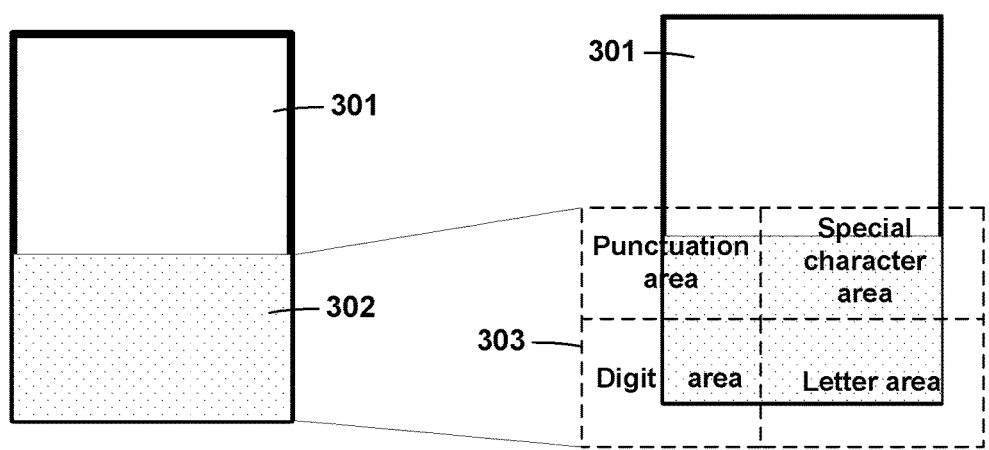
FIG. 3 shows a schematic diagram of the graphical interface for a touch screen of a mobile apparatus.

FIG. 3 shows a schematic diagram of a graphical interface for a touch screen of a mobile apparatus, where 301 represents a text inputting area, and 302 represents a virtual keyboard displaying area. There may be other areas in this interface which are not shown in the drawing.

When the virtual keyboard displaying area 302 is filled with a virtual keyboard having a large number of keys, the keys in the virtual keyboard displaying area 302 will be small and dense, which may affect the accuracy of touch input by the user. Therefore, a virtual keyboard 303 larger than the virtual keyboard displaying area 302 can be generated in this step. When the virtual keyboard 303 is large enough, the traditional mode of multi-view virtual keyboard will be broken and the commonly used key areas such as digit area, special character area, punctuation area and letter area can be spread on the virtual keyboard 303, thereby saving time for switching in different views and improving the efficiency and the experience of the users. In one embodiment, the virtual keyboard 303 can be generated when it is detected that the user wants to input and then be returned to the initial state where the virtual keyboard displaying area 302 is full with the whole virtual keyboard 303 after a delay of a predefined period.

There can be other ways for generating a virtual keyboard 303 larger than the virtual keyboard displaying area 302 in addition to that in the embodiment shown in FIG. 3. In one embodiment, a magnification factor of the virtual keyboard 303 can be predefined or set by the user. The magnification factor can also be determined based on the detected contact area of the user's finger so that the magnification factor of the virtual keyboard 303 is applicable to different fingers. In another embodiment, the virtual keyboard 303 may go beyond the virtual keyboard displaying area 302 only in one direction, for example, the commonly used letter keys being placed in the center and the digit keys, punctuation keys, special character keys or the like placed on the two sides.

As for the parts of the virtual keyboard 303 beyond the virtual keyboard displaying area 302, the inventor proposed an improved method which will be explained below with reference to step 202 in detail.

At step 202 shown in FIG. 2, the virtual keyboard 303 is moved in response to the sliding of the touch point, and at least one direction component of the moving direction of the virtual keyboard 303 is opposite to a direction component of the sliding direction of the touch point. The touch point is a contact position of the user's finger or a touch means such as a touch stylus with the touch screen detected through the touch screen.

The moving direction of the virtual keyboard can be different from that of the touch point in the horizontal or the vertical direction or be different at the both directions.

In one embodiment, the sliding speeds of the virtual keyboard 303 and the touch point can be the same or in a proportional relationship, thereby speeding up looking for the target key through a relative motion. In some cases, however, where the size of the virtual keyboard 303 exceeds the displaying area of the screen or the starting point of the sliding of the touch point is close to the boundary of the displaying area, resulting in a short sliding distance, multiple sliding actions by the user may be needed to reach the desired position of the virtual keyboard.

In an improved embodiment, the relationship between the instant moving speeds of the virtual keyboard 303 and the touch point can be controlled such that when the touch point moves to a boundary of the virtual keyboard displaying area 302, a boundary of the virtual keyboard 303 moves to correspond to the boundary of the virtual keyboard displaying area 302.

In another embodiment, the relationship between the instant moving speed of the virtual keyboard 303 and the instant sliding speed of the touch point can also be controlled such that when the touch point slides to a boundary point of the virtual keyboard displaying area 302, the boundary point of the virtual keyboard 303 moves to correspond to the boundary point of the virtual keyboard displaying area 302.

According to an implementation of present application, the relationship between the moving speed of the virtual keyboard 303 and the sliding speed of the touch point can be controlled in accordance with the positional relationship among the virtual keyboard 303, virtual keyboard displaying area 302 and the touch point.

The method can further include entering a target key in response to detecting an inputting operation at the position of the target key on the virtual keyboard.

For those skilled in the art, there exists techniques for distinguishing whether the operation at the position of a certain key on the virtual keyboard 303 is an entering operation or a sliding operation. For example, the distinguishing of whether the operation at the position of a certain key on the virtual keyboard 303 is an entering operation or a sliding operation can be performed based on whether the duration period of contact exceeds a predetermined duration threshold. In another embodiment, the first touch (for example, the odd times of touch) can be considered as a sliding operation and after the virtual keyboard 303 is moved to a new position according to the method mentioned above, the second touch following (for example, the even times of touch) can be considered as an entering operation, and the key at the position of the contact point is the key that is entered.

As an improvement, the keys on a track slide by the touch point are sequentially enlarged and lasted for a predetermined period, after which they are restored to the original size so as to make the input of user convenient. The magnification factor of the keys can also be determined based on the contact area of the finger with the touch screen.

Figure 4:
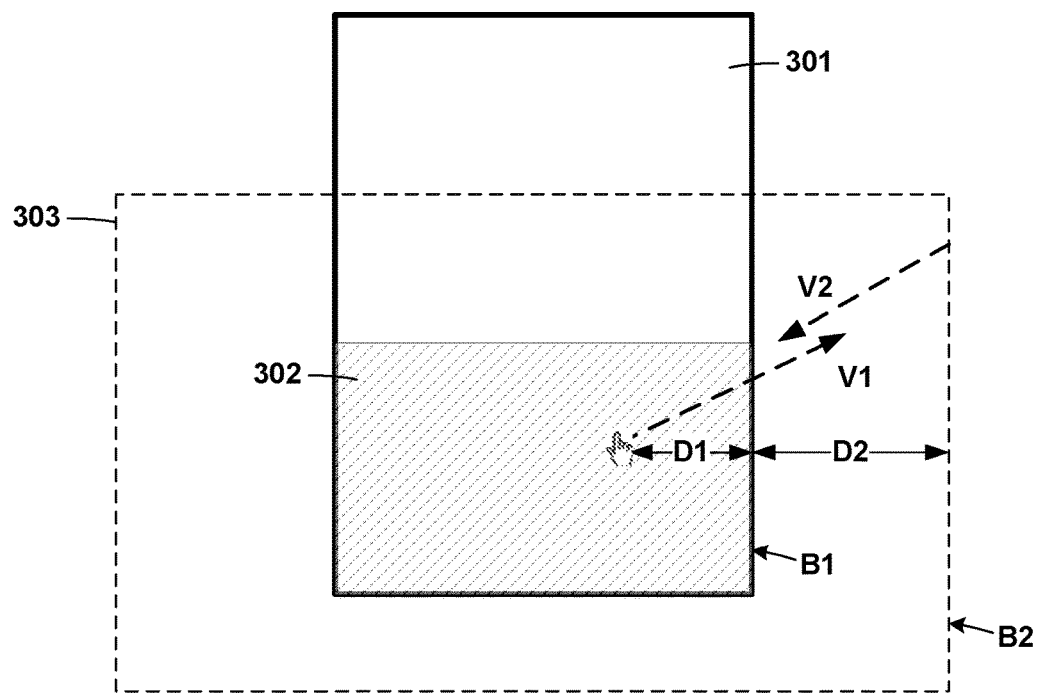
FIG. 4 shows a schematic diagram of the relationship between the moving speed of the virtual keyboard and the sliding speed of the touch point.

FIG. 4 shows a semantic diagram of the relationship between a moving speed V2 of the virtual keyboard 303 and the sliding speed V1 of the touch point (at the hand-shaped sign). FIG. 4 is used to explain how to control the relationship between the moving speed V2 of the virtual keyboard 303 and the sliding speed V1 of the touch point in accordance with the positional relationship among the virtual keyboard 303, the virtual keyboard displaying area 302 and the touch point. Where, V1 represents the sliding speed of the touch point and has a speed component V1$h$ in the horizontal direction and a speed component V1$v$ in the vertical direction;

V2 represents the moving speed of the virtual keyboard 303 and has a speed component V2$h$ in the horizontal direction and a speed component V2$v$ in the vertical direction;

D1 represents a distance from the touch point to a boundary B1 of the virtual keyboard displaying area 302 in the horizontal direction;

D2 represents a distance between the boundary B1 of the virtual keyboard displaying area 302 and a boundary B2 of the virtual keyboard 303, the boundary B1 and the boundary B2 both being the boundaries which the horizontal direction component of the sliding of the touch point points to.

Figure 5:
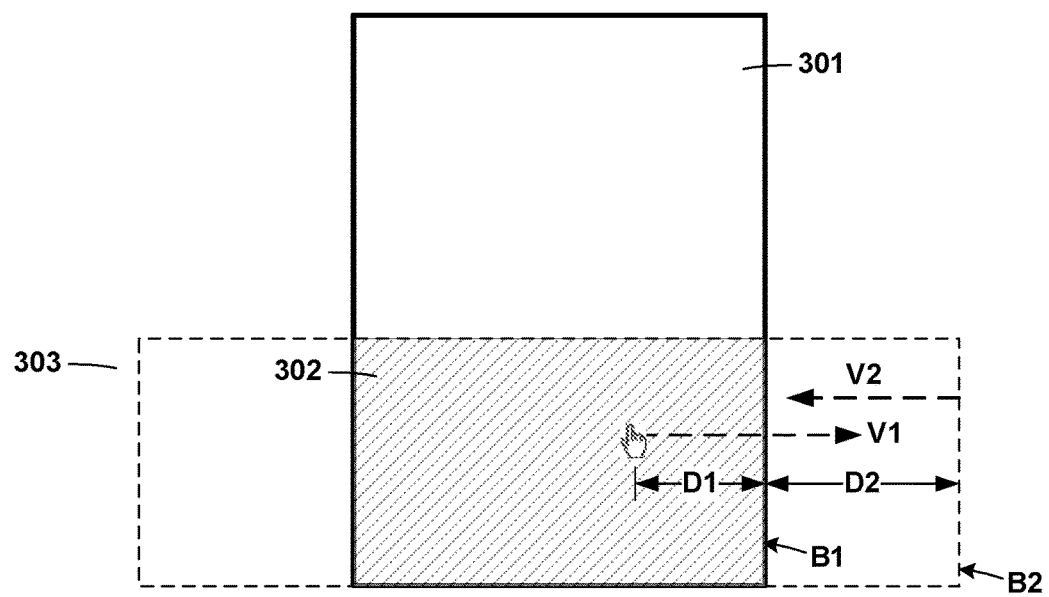
FIG. 5 shows a schematic diagram of a virtual keyboard which goes beyond the displaying area of the virtual keyboard only in the horizontal direction.

When D1/V1$h$=D2/V2$h$ is satisfied, i.e. V2$h$=V1$h$*D2/D1, the boundary B2 of the virtual keyboard 303 will move to correspond with the boundary B1 of the virtual keyboard displaying area 302 when the touch point moves to the boundary B1 of the virtual keyboard displaying area 302. That is, the boundary B2 of the virtual keyboard 303 will be displayed at the boundary B1 of the virtual keyboard displaying area 302. In the embodiment shown in FIG. 5, the virtual keyboard 303 goes beyond the virtual keyboard displaying area 302 only in the horizontal direction, and the virtual keyboard 303 may not be moved in the vertical direction so far as D1/V1$h$=D2/V2$h$ is satisfied only in the horizontal direction. In a similar way, based on that disclosed in the present application, those skilled in the art can achieve the similar technical effect at other boundaries by controlling the relationship between the moving speed V2 of the virtual keyboard 303 and the sliding speed V1 of the touch point without creative effort, details omitted here.

Therefore, based on the above embodiments, a technical solution of the present application can be generalized, that is, when the touch point moves to the boundary B1 of the virtual keyboard displaying area 302, the boundary B2 of the virtual keyboard 303 will move to correspond to the boundary B1 of the virtual keyboard displaying area 302 if the moving speed V2 of the virtual keyboard 303 V2=V1*D2/D1 is satisfied with respect to any one of the components in the opposite directions (in horizontal or vertical direction). Where V1 is a corresponding direction component of the sliding speed V1 of the touch point which is opposite to the direction component V2, D1 is a distance from the touch point to the boundary of the virtual keyboard displaying area 302 in the direction of the opposite direction components, and D2 is a distance from the boundary of the virtual keyboard displaying area 302 to the boundary of the virtual keyboard 303 in the direction of the opposite direction components.

Figure 6:
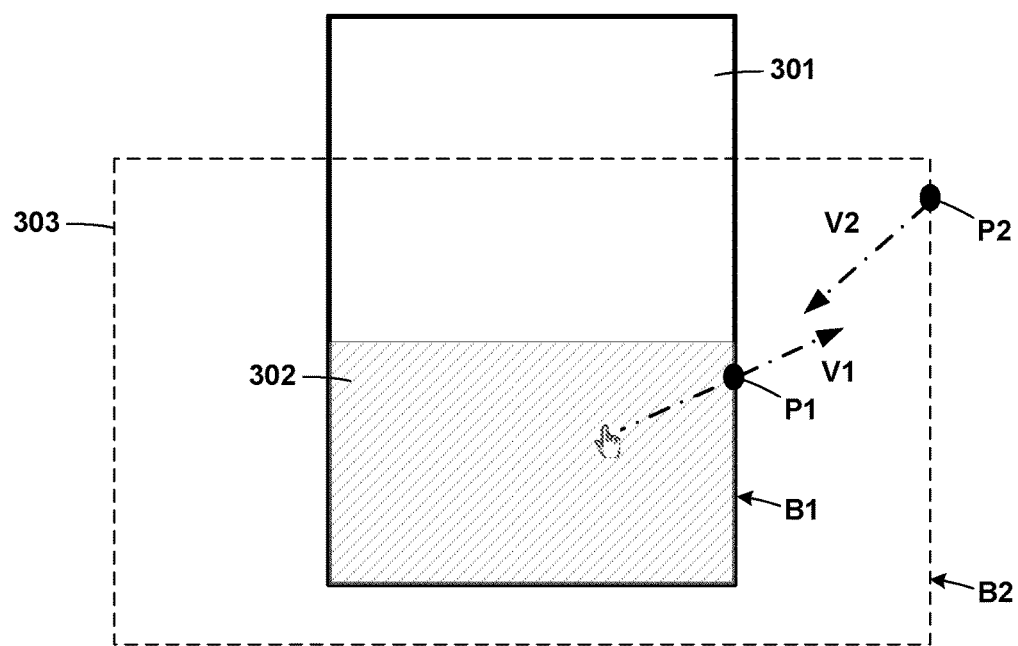
FIG. 6 shows a schematic diagram of a improved embodiment.

FIG. 6 shows an improved embodiment in which the relationship between the moving speed V2 of the virtual keyboard 303 and the sliding speed V1 of the touch point can further be controlled with respect to the horizontal or vertical direction component so that when the touch point moves to a boundary point P1 of the virtual keyboard displaying area 302, a boundary point P2 of the virtual keyboard 303 will move to correspond to the boundary point P1 of the virtual keyboard displaying area 302. That is, the boundary point P2 of the virtual keyboard 303 is displayed at the boundary point P1 of the virtual keyboard displaying area 302. Although the shapes of the virtual keyboard 303 and the virtual keyboard displaying area 302 may or may not be similar to each other, the boundary point P2 corresponding to the boundary point P1 can be defined in the virtual keyboard 303 in accordance with the relative position of the first boundary point P1 in the virtual keyboard displaying area 302. In the embodiment shown in FIG. 6, the moving directions of the virtual keyboard 303 of the touch point are not exactly opposite to each other.

With the above implementations, the whole area of the virtual keyboard 303 can be moved into the virtual keyboard displaying area 302 by sliding the touch point only once. At the same time, the moving direction of the touch point can approximately tend to the orientation in which the target key locates, thereby complying with the intuition of the users much more. Moreover, with the technical solution of present application that the speed of the virtual keyboard 303 is different as the starting position of the finger's sliding differs, a new experience is provided to the user That is, when starting sliding with the fingers at different floating positions (different fingers floating at different positions on the touch screen), the moving speed V2 of the virtual keyboard 303 will be different. The user can slide with the finger (for example the thumb) farther from the target key when intending to move the virtual keyboard 303 to a relatively near target key with relatively slow speed and can slide with the finger (for example, the little finger) close to the boundary of the keyboard displaying area when intending to move to the boundary of the virtual keyboard 303 quickly.

Figure 7:
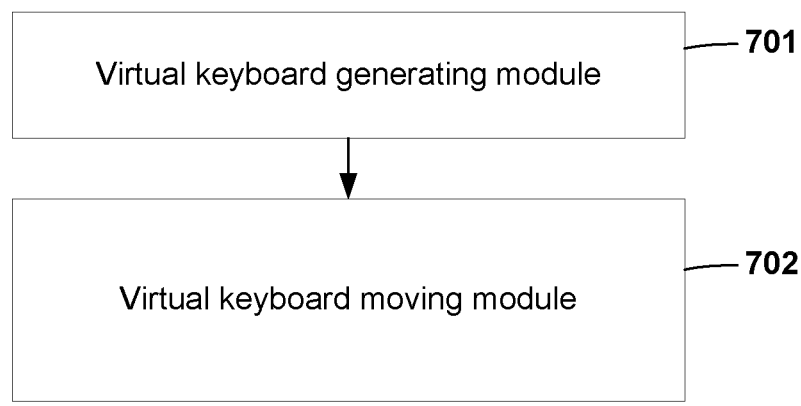
FIG. 7 shows a device for controlling a mobile apparatus having a touch screen.

FIG. 7 shows a device for controlling a mobile apparatus having a touch screen, the device including:

a virtual keyboard generating module 701 configured to generate a virtual keyboard which is larger than a virtual keyboard displaying area 302 in the touch screen;

a virtual keyboard moving module 702 configured to move the virtual keyboard 303 in response to the sliding of a touch point, where at least one direction component of a moving direction of the virtual keyboard 303 is opposite to a direction component of a sliding direction of the touch point. The opposite direction components can be horizontal direction components and/or vertical direction components.

With reference to FIG. 7, and continued reference to FIG. 4, in an improved embodiment, the virtual keyboard moving module 702 includes a module for controlling a relationship between a moving speed V2 of the virtual keyboard and a sliding speed V1 of the touch point so that when the touch point moves to a boundary of the virtual keyboard displaying area 302, a boundary of the virtual keyboard 303 will move to correspond to the boundary of the virtual keyboard displaying area 302. In another improved embodiment, the virtual keyboard moving module 702 includes a module for controlling a relationship between a moving speed V2 of the virtual keyboard 303 and a sliding speed V1 of the touch point so that when the touch point slides to a boundary point B1 of the virtual keyboard displaying area 302, a boundary point B2 of the virtual keyboard 303 will move to correspond to the boundary point B1 of the virtual keyboard displaying area 302.

In the above embodiments, the virtual keyboard moving module 702 further includes a module for controlling a relationship between a moving speed V2 of the virtual keyboard and a sliding speed V1 of the touch point in accordance with a positional relationship among the virtual keyboard, the virtual keyboard displaying area 302 and the touch point.

In the above embodiments, the module for controlling a relationship between the moving speed V2 of the virtual keyboard 303 and the sliding speed V1 of the touch point in accordance with a positional relationship among the virtual keyboard 303, the virtual keyboard displaying area 302 and the touch point can further include a module for causing the opposite direction component of the moving speed V2 of the virtual keyboard 303 to meet with the equation v2=v1*d2/d1, where v1 is a corresponding direction component of the sliding speed V1 of the touch point which is opposite to direction component v2, d1 is a distance from the touch point to the boundary B1 of the virtual keyboard displaying area 302 in the direction of the opposite direction components, and d2 is a distance from the boundary B1 of the virtual keyboard displaying area 302 to the boundary B2 of the virtual keyboard 303 in the direction of the opposite direction components.

In another implementation, the virtual keyboard moving module 702 further includes a module for causing the moving speed V2 of the virtual keyboard 303 to be the same as, or in proportion to, the sliding speed of the touch point.

As an improvement, the virtual keyboard moving module 702 can further include a module for entering a content represented by a key at a corresponding position when an inputting operation on the virtual keyboard 303 by the user is detected.

It can be appreciated that the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block diagrams may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A computer system for controlling a mobile apparatus having a touch screen, the computer system comprising:
   one or more computer processors, one or more computer-readable storage media, and program instructions stored on the one or more computer-readable storage media for execution by at least one of the one or more computer processors, the program instructions comprising:
      program instructions to generate a virtual keyboard which is larger than a virtual keyboard displaying area in the touch screen;
      program instructions to move the virtual keyboard in response to a sliding of a touch point, wherein at least one direction component of a moving direction of the virtual keyboard is opposite to a direction component of a sliding direction of the touch point; and
      program instructions to control a relationship between a moving speed of the virtual keyboard and a sliding speed of the touch point so that, when the touch point slides to a boundary of the virtual keyboard displaying area, a boundary of the virtual keyboard will move to correspond to the boundary of the virtual keyboard displaying area,
   wherein the program instructions to control the relationship between the moving speed of the virtual keyboard and the sliding speed of the touch point comprises:
      program instructions to cause one of the direction components of the moving speed of the virtual keyboard v2 to meet with the equation:

$$v2 = v1 * d2/d1$$

wherein v1 is a corresponding direction component of the sliding speed of the touch point which is opposite to direction component v2, d1 is a distance from the touch point to a boundary of the virtual keyboard displaying area in the direction of the opposite direction components, and d2 is a distance from the boundary of the virtual keyboard displaying area to a boundary of the virtual keyboard in the direction of the opposite direction components.

2. The computer system according to claim 1, wherein the program instructions to move the virtual keyboard in response to the sliding of the touch point comprises:
   program instructions to cause a boundary point of the virtual keyboard to correspond to the boundary point of the virtual keyboard displaying area when the touch point slides to the boundary point of the virtual keyboard displaying area.

3. The computer system according to claim 1, wherein the program instructions to move the virtual keyboard in response to the sliding of the touch point comprises:
   program instructions to control the relationship between the moving speed of the virtual keyboard and the sliding speed of the touch point in accordance with a positional relationship among the virtual keyboard, the virtual keyboard displaying area and the touch point.

4. The computer system according to claim 1, wherein the program instruction to move the virtual keyboard in response to the sliding of the touch point comprises:
   program instruction to cause the moving speed of the virtual keyboard to be the same as the sliding speed of the touch point.

5. The computer system according to claim 1, further comprising:
   program instruction to enter a target key in response to an inputting operation at a position of the target key on the virtual keyboard.

6. The computer system according to claim 1, wherein the opposite direction components are horizontal direction components, vertical direction components, or some combination thereof.

7. The computer system according to claim 1, wherein the program instruction to move the virtual keyboard in response to the sliding of the touch point comprises:
   program instruction to cause the moving speed of the virtual keyboard to be proportional to the sliding speed of the touch point.

8. The computer system according to claim 1, further comprising:
   program instructions to determine a magnification factor of the virtual keyboard based on a detected contact area of a user's finger so that the magnification factor of the virtual keyboard is applicable to different fingers.

* * * * *